US 6,589,118 B1

(12) United States Patent
Soma et al.

(10) Patent No.: US 6,589,118 B1
(45) Date of Patent: Jul. 8, 2003

(54) ANALOG INPUT DEVICE TO INPUT MULTI DIRECTIONAL SIGNALS

(75) Inventors: Masahiro Soma, Fukushima-ken (JP); Toshio Furudate, Fukushima-ken (JP); Ryoichi Maeda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 192 days.

(21) Appl. No.: 09/588,143

(22) Filed: Jun. 2, 2000

(30) Foreign Application Priority Data

Jun. 4, 1999 (JP) .......................................... 11-158767
Jun. 4, 1999 (JP) .......................................... 11-158768
Jun. 4, 1999 (JP) .......................................... 11-158769

(51) Int. Cl.⁷ ............................................... A63F 13/00
(52) U.S. Cl. ......................................... 463/38; 463/37
(58) Field of Search .................... 463/37, 38; 345/161, 345/156; 178/19.02, 19.04

(56) References Cited

U.S. PATENT DOCUMENTS

| 5,716,274 A | | 2/1998 | Goto et al. | |
| 5,853,326 A | | 12/1998 | Goto et al. | 463/37 |
| 5,912,612 A | * | 6/1999 | DeVolpi | 200/512 |
| 5,976,018 A | * | 11/1999 | Druckman | 273/148 B |
| 5,984,785 A | * | 11/1999 | Takeda et al. | 345/156 |
| 6,059,660 A | * | 5/2000 | Takada et al. | 273/148 B |
| 6,067,005 A | * | 5/2000 | DeVolpi | 200/512 |
| 6,102,802 A | * | 8/2000 | Armstrong | 463/37 |
| 6,342,009 B1 | * | 1/2002 | Soma | 273/148 B |

FOREIGN PATENT DOCUMENTS

| DE | 197 31 375 A1 | 1/1999 |
| EP | 0 691 666 A1 | 1/1996 |

* cited by examiner

*Primary Examiner*—S. Thomas Hughes
*Assistant Examiner*—Corbett Coburn
(74) *Attorney, Agent, or Firm*—Brinks Hofer Gilson & Lione (57) ABSTRACT

An input device for a game machine for inputting signals to a game machine using a computer, including: at least one control member projecting to the outside of a casing; a movement-transmitting member formed around the control member and operatively associated with the movement of an operating point of the control member, the movement-transmitting member being provided with a plurality of conductive elastic members; and a board provided in the casing and having formed thereon resistors corresponding to the conductive elastic members, the conductive elastic members changing the area of contact between the conductive elastic members and the resistors according to a direction of movement and a tilt angle of the operating point of the control member so as to vary the amount of resistance; wherein, by moving the operating point of the control member, analog signals corresponding to the movement are input to the game machine.

13 Claims, 7 Drawing Sheets

ANALOG INPUT DEVICE TO INPUT MULTI DIRECTIONAL SIGNALS

BACKGROUND OF THE INVENTION

1. Field of the Invention

The present invention relates to an input device for a game machine using a computer which allows a game player to enjoy a fully realistic game in real time on a screen of the game machine by operating a control member, such as a control key, a control button, and a control lever.

2. Description of the Related Art

In recent years, game machines using computers (hereinafter, referred to simply as a "game machine") have rapidly become widespread in which it is possible for a game player to enjoy a game on a display screen by operating various control members, such as control keys, control buttons, and control levers according to a game software previously stored in a computer device or input at the time of game play. As the software used in such game machine, various types of software, such as a role-playing type, speed competition type, fight/dialogue type, and creating/rearing type software have been conceived.

For example, when a general-purpose computer is used as a game machine using game software previously stored or input at the time of game play, a key board, a mouse, and the like, are used as input devices. In most cases, however, a game machine exclusively for games is used and therefore, an input device called a "controller" or a "joy stick", provided separately from the game machine, is generally used as the input device to be operated by a game player.

This input device is called a controller having a so-called multi-face switch, and has a cross key, a key top, a selection key, and a control lever provided on the upper surface of a casing substantially shaped like a rectangular parallelepiped (or a modification thereof), and one or more button keys are provided on the right-hand and left-hand sides of the front face. Furthermore, on the inner surface of the upper part of the casing, there is provided a first board, such as a flexible board, provided with a contact portion connected to digital control members, such as the cross key, the key top, the selection key, and the like. On the inner surface of the lower part of the casing, that is, below the first board, there is provided a second board, such as a printed board, provided with a contact portion connected to an analog control member, such as the control lever. Furthermore, on the inner surface of the front face, there is provided a printed board provided with a contact portion connected to each button key. These flexible and printed boards are electrically connected to each other, and furthermore, are connected to the game machine by a cable via a connector. In some cases, no cable is used, and connection to the game machine is effected wirelessly.

In the input device as described above, by being continuously turned around the turning fulcrum, the control lever is continuously moved in an arbitrary direction, forward, backward, rightward, and leftward, so as to continuously change the actions of persons, operating states of vehicles, and the like according to the game on the screen.

The game player can enjoy a game projected onto the display screen by appropriately operating various keys or the control lever with fingers in accordance with the progress of the game.

An analog input section of the above input device comprises several control levers capable of turning about fulcrums, and two sets of rotary potentiometers having rotation axes in two perpendicular directions for detecting the turning directions and angles of the control levers. The motion of each of the control levers is detected by an output signal from the corresponding rotary potentiometer, and the detected value is input to the game machine.

However, in the input device of a type in which rotary potentiometers for detecting the turning directions and the like of the control levers of the analog input section are provided between the control levers and printed boards connected to the control levers, the structure is complicated. In addition, since expensive rotary potentiometers are used, the cost of the input device increases.

SUMMARY OF THE INVENTION

Accordingly, the present invention has been made in view of the foregoing problems, and an object thereof is to provide an input device for a game machine which allows simplification of the structure of an analog input section having control members, such as a control lever, and to reduce the cost thereof.

It is another object of the present invention to provide an input device for a game machine which is able to reduce the size, thickness, and weight of the device by reducing the number of boards used therein.

It is a further object of the present invention to provide an input switch which makes it possible to obtain analog variable output in accordance with an operating force.

In order to achieve the above objects, according to a first aspect of the present invention, there is provided an input device for a game machine for inputting signals to a game machine using a computer, including: at least one control member projecting to the outside of a casing; a movement-transmitting member formed around the control member and operatively associated with the movement of an operating point of the control member, the movement-transmitting member being provided with a plurality of conductive elastic members; and a board provided in the casing and having formed thereon resistors corresponding to the conductive elastic members, the conductive elastic members changing the area of contact between the conductive elastic members and the resistors according to a direction of movement and a tilt angle of the operating point of the control member so as to vary the amount of resistance; wherein, by moving the operating point of the control member, analog signals corresponding to the movement are input to the game machine.

With this configuration, unlike a conventional input device for a game machine in which rotary potentiometers are provided between a control member and a board connected to the control member, an analog input section has a simple structure, and signals corresponding to the movement of the operating point of the control member can be input to the game machine without using the expensive rotary potentiometers. Therefore, it is possible to reduce the cost of the input device.

The analog input section of the input device for a game machine according to the present invention operates in association with the movements of the control member and the operating point of the control member, and includes the control member, the movement-transmitting member, the conductive elastic members, and the resistors.

Since the analog input section of the input device for a game machine of the present invention has no need of including the rotary potentiometers included in the analog input section of the conventional input device for a game machine, the thickness of the analog input section is reduced, whereby it is possible to reduce the size and thickness of the overall device.

In addition, the thickness of the analog input section of the input device for a game machine of the present invention can be very reduced as compared to the analog input section having the rotary potentiometers included in the conventional input device for a game machine. Therefore, unlike the conventional input device for a game machine in which an analog input section is provided on a second board that is separately provided from a first board having provided thereon contact portions connected to digital control members, such as a cross key, a key top, selection keys and the like, the analog input section of the input device for a game machine of the present invention can be provided on the board having provided thereon the contact portions connected to the digital control members, such as the cross key, the key top, and the selection keys, and the resistors can be provided on the board. Therefore, the number of boards used in the device can be reduced, and the thickness and weight of the analog input section are reduced, whereby it is possible to reduce the size, thickness, and weight of the overall device.

In the input device for a game machine of the present invention, the movement-transmitting member may preferably be skirt-shaped, and a peripheral section of the skirt abuts against the bottom of the casing to serve as a tilt fulcrum when the control member is tilted. With this configuration, the rotation length between the fulcrum and the conductive elastic members is elongated, whereby the force of contact between the conductive elastic members and the resistors according to the tilting operation of the control member can be stabilized.

In addition, in the input device for a game machine of the present invention, each of the conductive elastic members may preferably be shaped like one of a frustum of a pyramid and a truncated cone, and may be gradually deformed from an end thereof according to an operating force exerted on the control member. With this configuration, the areas of deformation of the conductive elastic members are correctly changed according to the operating force, whereby the areas of contact between the conductive elastic members and the resistors can be precisely changed.

Furthermore, in the input device for a game machine of the present invention, elastically deformable support members may preferably be attached to the movement-transmitting member, and the conductive elastic members may preferably be provided on the bottoms of the support members. With this configuration, the thickness of the input device can be reduced. In addition, the support members are deformed by the tilting operation of the control member, whereby the conductive elastic members and the resistor smoothly contact each other.

According to a second aspect of the present invention, there is provided an input device for a game machine for inputting signals to a game machine using a computer, including: at least one control member projecting to the outside of a casing; a movement-transmitting member provided around and separately from the control member and operatively associated with the movement of an operating point of the control member from a neutral axis, the movement-transmitting members being provided with a plurality of first contacts; a board provided in the casing and having formed thereon a plurality of second contacts constituting planar analog switches with the first contacts; and a push switch provided in the casing at a position corresponding to the control member for effecting ON/OFF operation in response to upward and downward movements of the operating point of the control member.

With this configuration, unlike a conventional input device for a game machine in which rotary potentiometers are provided between a control member and a board connected to the control member, an analog input section has a simple structure, and signals corresponding to the movement of the operating point of the control member can be input to the game machine without using the expensive rotary potentiometers. Therefore, it is possible to reduce the cost of the input device.

In addition, with the above configuration, one control member can serve as both of an analog control member and a digital control member. That is, when the control member is moved downward so that the operating point thereof does not offset from the neutral axis, the control member pushes the push switch in the ON state. Since, however, the movement-transmitting member does not move and the first contacts do not come into contact with the second contacts, digital signals are input to the game machine. When the control member is depressed so that the operating point thereof moves from the neutral axis, the movement-transmitting member moves to bring the first contacts into contact with the second contacts, and moreover, the areas of contact between the first and second contacts correspond to the amount of movement of the operating point, but the control member does not come into contact with the push switch. Therefore, analog signals are input to the game machine. When the control member is axially pushed and depressed so that the operating point thereof moves from the neutral axis, both of the digital signals and analog signals are input to the game machine.

An analog input section of the input device for a game machine according to the present invention operates in association with the movements of the control member and the operating point of the control member, and includes the control member and planar analog switches consisting of the first contacts and the second contacts.

In the input device for a game machine of the present invention, each of the first contacts may preferably be composed of a conductive elastic member shaped like one of a frustum of a pyramid and a truncated cone, and ends of the conductive elastic members may gradually come into contact with the second contacts, whereby the area of contact is changed. With this configuration, the areas of deformation of the conductive elastic members are correctly changed according to the operating force, whereby the areas of contact between the conductive elastic members and the resistors can be precisely changed.

In addition, in the input device for a game machine of the present invention, the movement-transmitting member may have a through hole in the center thereof, and the control member may be inserted into the through hole to be supported so as to move up and down. With this configuration, it is possible to simplify the operational structure of the push switch.

According to a third aspect of the present invention, there is provided an input device for a game machine for inputting signals to a game machine using a computer, comprising: at least one analog control member and at least one digital control member projecting to the outside of a casing; an analog input section operating in association with the movement of an operating point of the analog control member; a digital input section for effecting ON/OFF operation in response to the operation of the digital control member; and a board having formed thereon one of contacts constituting the analog input section and one of contacts constituting the digital input section.

With this configuration, unlike the conventional input device for a game machine in which the analog input section is provided on a second board that is separately provided from a first board having provided thereon contact portions connected to digital control members, such as a cross key, a key top, selection keys and the like, one of the contacts constituting the contact portion of the analog input section can be provided on the board having provided thereon one of the contacts constituting contact portions connected to the digital control members, such as the cross key, the key top, and the selection keys, and the like. Therefore, the number of boards used in the device can be reduced, and the thickness and weight of the analog input section are reduced, whereby it is possible to reduce the size, thickness, and weight of the overall device.

In the input device for a game machine of the present invention, the analog input section may preferably be composed of a conductive elastic member provided on the analog control member and a resistor opposing the conductive elastic member, the digital input section may preferably be composed of a first contact provided on the digital control member and a second contact opposing the first contact, and a resistor and the second contact may be formed on one board. With this configuration, it is possible to reduce the size, thickness, and weight of overall device.

According to a fourth aspect of the present invention, there is provided an input switch comprising a switch section having a movable contact and moved up and down by an operating force; and a board having a fixed contact disposed to oppose the movable contact, and the movable contact being brought into contact with the fixed contact by the downward movement of the switch section to thereby output signals; wherein the movable contact is composed of a conductive elastic member shaped like one of a frustum of a pyramid and a truncated cone and the fixed contact is composed of a resistor formed on the board, and the amount of resistance of the resistor is variable and variable output values are obtained by changing the area of contact between the conductive elastic member and the resistor. With this configuration, the area of deformation of the conductive elastic member is correctly changed according to the operating force, and the areas of contact between the conductive elastic member and the resistor can be precisely changed, whereby precise output values can be obtained.

In the input switch of the present invention, the board may be a flexible board, and the switch section may be supported on the surface of the flexible board and have elastically deformable legs. With this configuration, it is possible to provide a thin input switch.

Further objects, features, and advantages of the present invention will become apparent from the following description of the preferred embodiment with reference to the attached drawings.

DESCRIPTION OF THE PREFERRED EMBODIMENT

An embodiment of an input device for a game machine according to the present invention will now be described with reference to the drawings.

Figure 1:
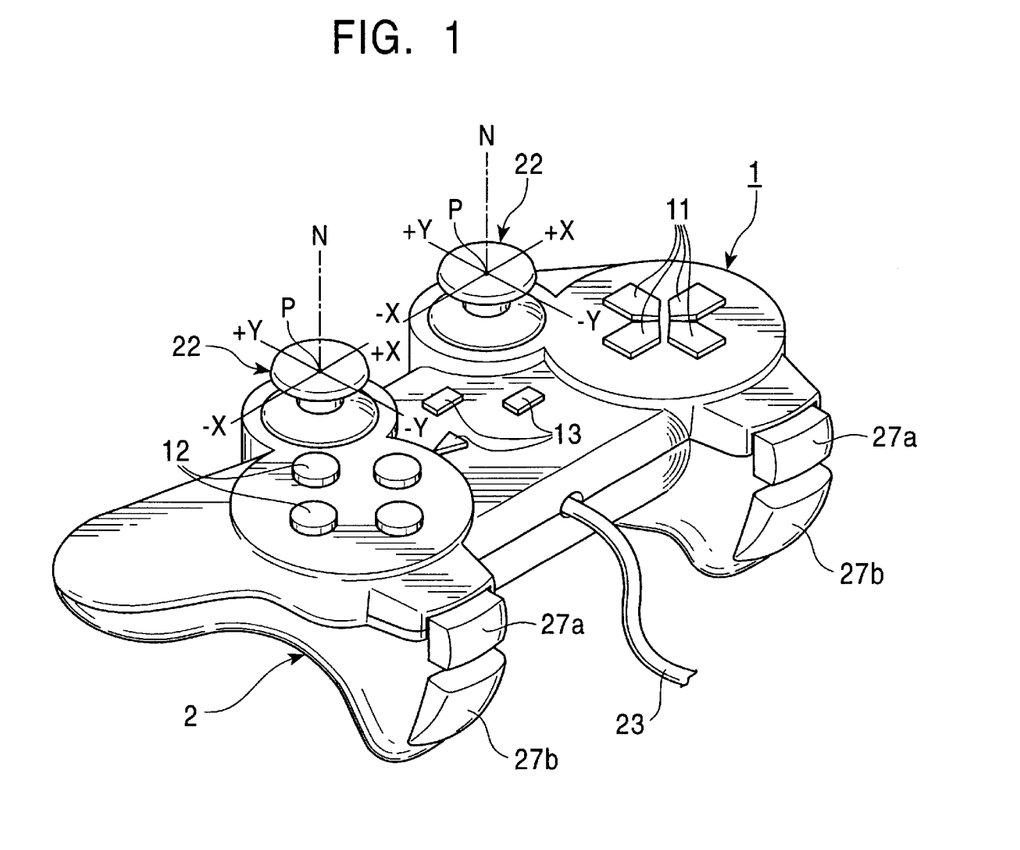
FIG. 1 is a perspective view showing an input device (controller) for a computer game machine according to an embodiment of the present invention.
Figure 2:
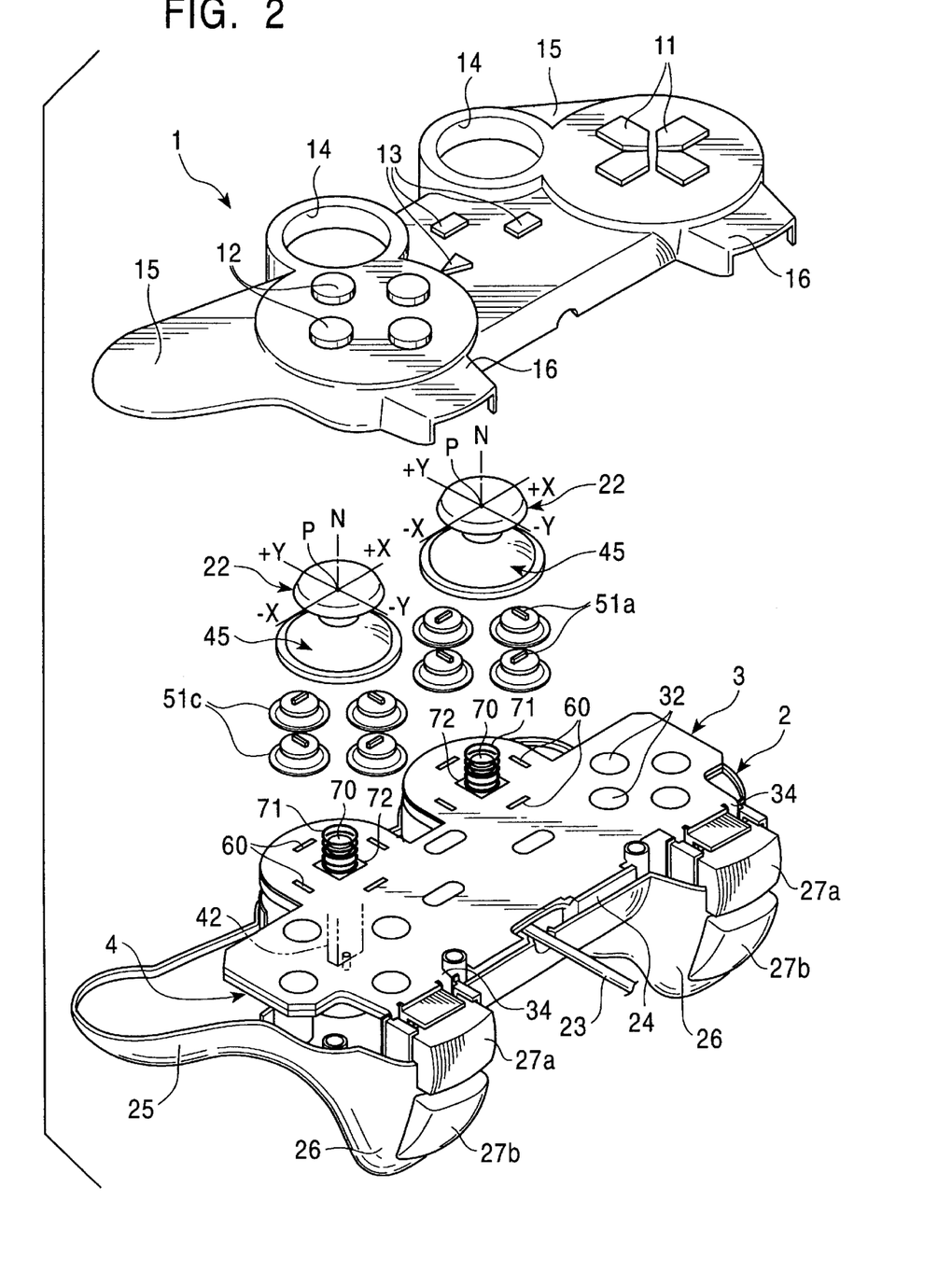
FIG. 2 is an exploded perspective view of the controller for a computer game machine.

FIG. 1 is a perspective view showing a controller (input device) for a computer game machine according to an embodiment of the present invention, and FIG. 2 is an exploded perspective view of the controller. Referring to FIGS. 1 and 2, there is provided an upper casing (first casing member) 1 constituting the upper side of a casing section of the controller, a lower casing (second casing member) 2 constituting the lower side of the casing section, a flexible board 3 accommodated in the inner space defined by the upper casing 1 and the lower casing 2, and a plate (fixing member) 4 for pressing the flexible board 3 against the inner surface of the upper casing 1 and fixing it thereto.

On the upper surface of the upper casing 1, there are provided on one side a cross key (digital control member) 11, on the other end a key top (digital control member) 12 consisting of four kinds of keys, and selection keys (digital control members) 13 in the middle. Formed at the back side of the upper surface of the upper casing 1 are holes 14 into which control levers (control members) 22 described below are inserted and from which the head portions of the control levers 22 project. On both sides of the casing 1, half members 15 are formed so as to project on the back side. On the other hand, at both ends of the front face side (the side opposite to the operator) of the upper surface, there are formed protrusions 16, each having a U-shaped cross-sectional configuration, so as to protrude forward.

The plate 4 is mounted in the lower casing 2, and the flexible board 3 is mounted on the plate 4. The lower casing 2 is provided with a connector (not shown) connected to a cable 23 for extracting signals from the flexible board 23.

The control levers 22 are arranged on the flexible board 3. On both sides of the control levers 22, there are formed half members 25 which project on the back side and which are connected to the above half members 15 to constitute hollow accommodating sections. Protrusions 26 connected to the protrusions 16 are formed at both ends of the front face side of the lower casing 2, and button keys (digital control members) 27a and 27b are attached to the protrusions 26.

Figure 3:
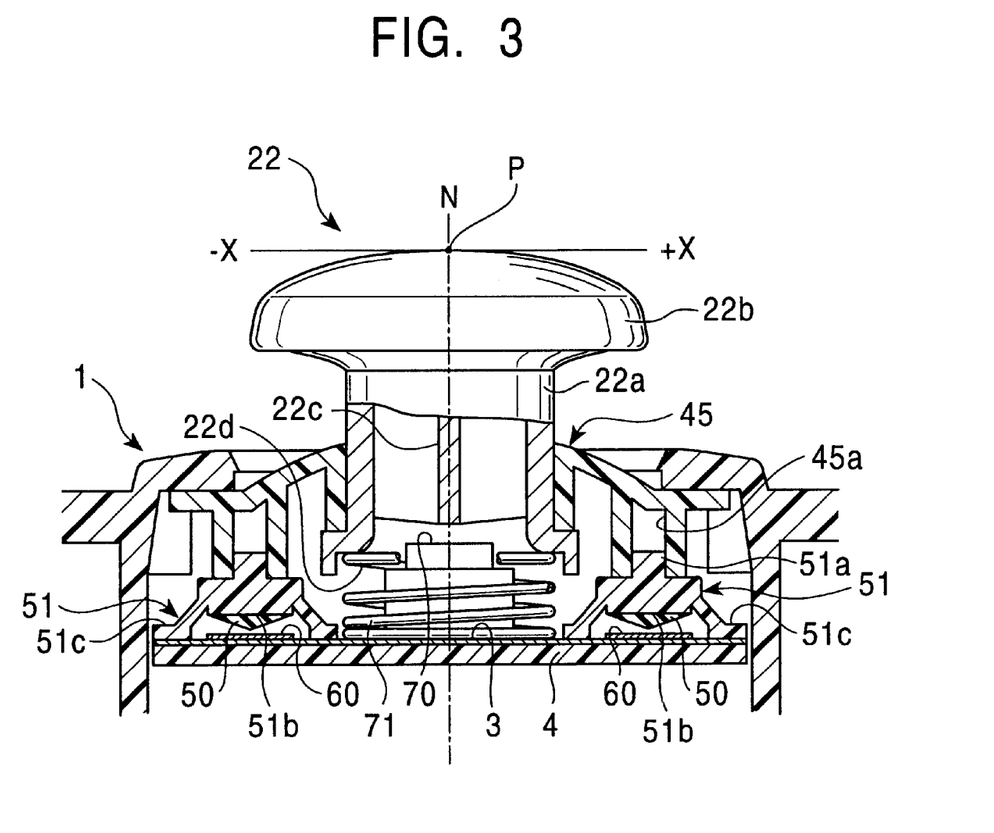
FIG. 3 is a sectional view showing a state in which a control lever provided in the input device for a computer game machine is not operated.

As shown in FIG. 3, each control lever 22 is generally composed of a cylindrical stick 22a and a substantially disk-like stick gripping portion 22b coaxially provided on one end of the stick 22a.

Figure 5:
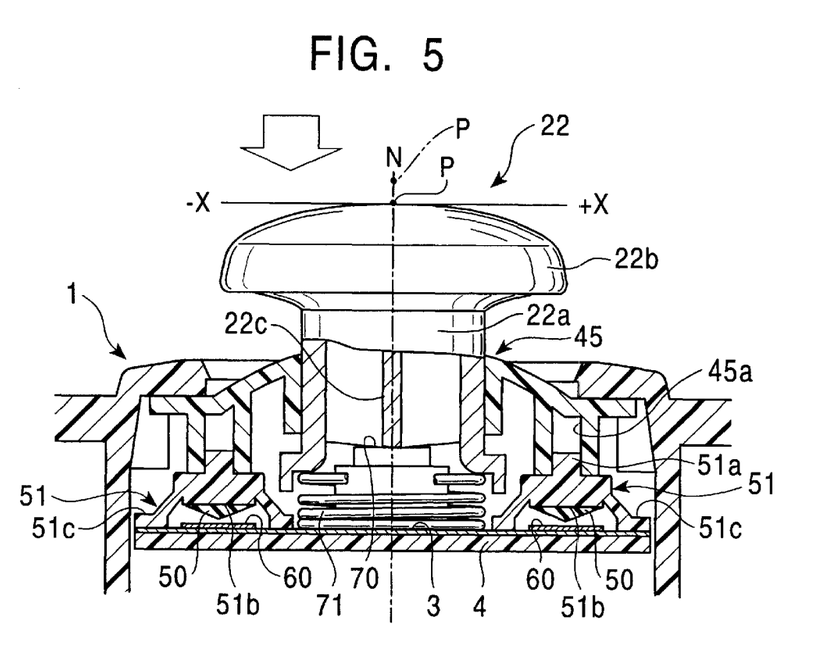
FIG. 5 is a sectional view showing an example of a state in which the control lever is axially depressed.

In the stick 22a, there is provided a rod 22c for effecting ON/OFF operation of a push switch 70 according to upward and downward movements of the control lever 22. A flared presser portion 22d is formed at the lower end of the stick 22a so as to compress a coil spring 71 fitted around in the push switch 70 or remove the compression to return the spring 71 to its original state according to the upward and downward movements of the control lever 22, as shown in FIGS. 3 and 5.

Figure 4:
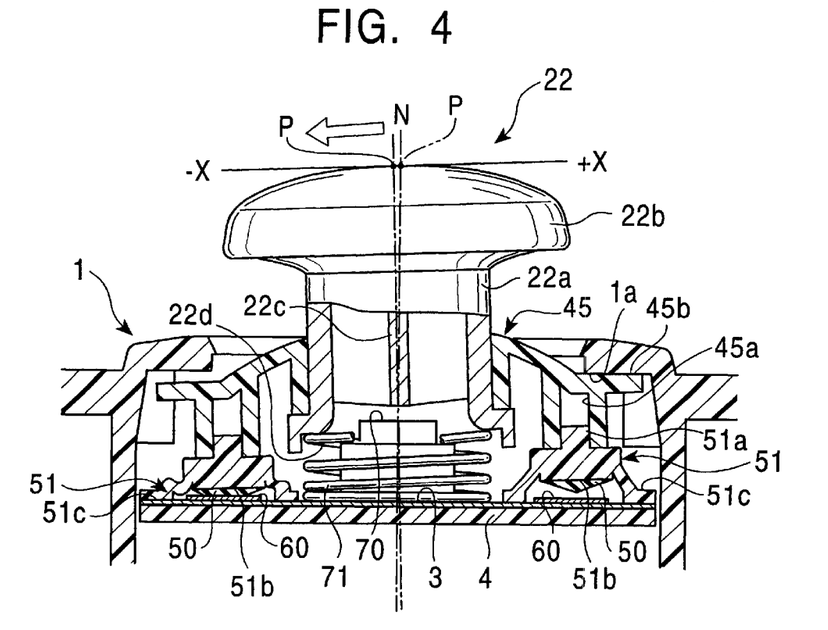
FIG. 4 is a sectional view showing an example of a state in which the control lever is pushed down so that an operating point of the lever moves from a neutral axis.

As shown in FIG. 4, a skirt-like movement-transmitting member 45, which is operatively associated with the stick 22a when an operating point P of the control lever 22 moves from a neutral axis N, is provided separately from the control lever 22 around the stick 22a. The stick 22a is inserted into a through hole formed in the center of the movement-transmitting member 45 and is supported so that it can move up and down in the through hole. The lower surface (surface on the side of the lower casing 2) of the movement-transmitting member 45 is provided with a plurality of (four in this embodiment) fitting recesses 45a at equal intervals to be fitted to projections 51a of support members 51 for supporting conductive elastic members 50.

The support members 51 include mounting surfaces 51b provided on the side of the flexible board 3, the projections 51a provided on the side of the movement-transmitting member 45, and legs 51c formed of a elastically deformable material and extended from the mounting surfaces 51b toward the flexible board 3 to be mounted to the flexible board 3, and the conductive elastic members 50 are mounted to the mounting surfaces 51b. When the control lever 22 is not operated, a clearance is formed between the conductive elastic members 50 and the flexible board 3.

The projections 51a of the support members 51 are fitted to the fitting recesses 45a formed in the movement-transmitting member 45, whereby the support members 51 are mounted to the movement-transmitting member 45. The movement-transmitting member 45 is provided with a plurality of (four in this embodiment) conductive elastic members 50 formed of a conductive rubber and the like.

Therefore, the arrangement is such that the movement-transmitting member 45 provided around the stick 22a of each control lever 22 is provided with conductive elastic members 50 in four directions, +X direction, −X direction, +Y direction, and −Y direction, around the neutral axis N of the control lever 22.

As shown in FIGS. 2 and 3, resistors 60 are disposed on the surface of the flexible board 3 at positions corresponding to the conductive elastic members 50 provided on the movement-transmitting members 45. Furthermore, the conductive elastic members 50 and the resistors 60 constitute planar analog switches.

The flexible board 3 is provided with push switches 70 (contact portions) at positions corresponding to the control levers 22 for effecting ON/OFF operation in response to upward and downward movements of the control levers 22, and holes 72 for protruding the coil springs 71 provided around the push switches 70 from the plate 4 toward the control levers 22.

The analog input section of this embodiment operates in association with the movement of the control levers 22 and the operating points P of the control levers 22, and is composed of the control levers 22, the movement-transmitting member 45, the conductive elastic members 50, the support members 51, and the resistors 60.

Each conductive elastic member 50 is shaped like a frustum of pyramid or a truncated cone, and is able to vary the amount of resistance of each resistor 60 by changing the area of contact between the elastic member 50 and the resistor 60 according to the direction and the tilt angle of each control lever 22 when the operating point of the control lever 22 moves from the neutral axis N. That is, a value of resistance per unit area of the conductive elastic member 50 is smaller than that of the resistor 60, and the more the area of contact increases, the more the value of resistance decreases and the larger the electric current passing through the resistor 60.

Figure 6:
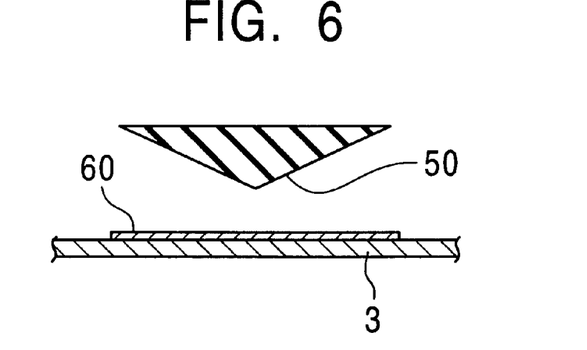
FIG. 6 is a sectional view showing a state of a conductive elastic member when the control lever is not operated.

For example, when the control lever 22 is not operated, as shown in FIG. 3, the operating point P of the control lever 22 is on the neutral axis N and does not move up and down along the neutral axis N. In this state, since the four conductive elastic members 50 mounted on the movement-transmitting member 45 are not in contact with the corresponding resistors 60, as shown in FIGS. 3 and 6, the values of resistance of the resistors 60 do not change, and the normal electric current passes through the resistors 60.

Figure 8:
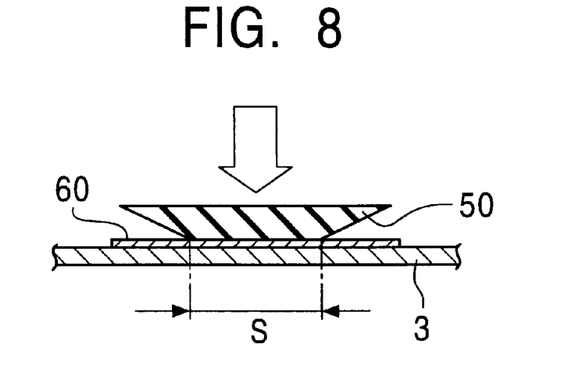
FIG. 8 is a sectional view showing another example of a state of the conductive elastic member when the control lever is depressed so that the operating point thereof moves from the neutral axis.

When the control lever 22 is tilted in the −X direction, as shown in FIG. 4, the operating point P of the control lever 22 moves in the −X direction to a position offset from the position on the neutral axis N during non-operation of the control lever 22. In this state, the conductive elastic member 50 located in the −X direction of the movement-transmitting member 45 is pressed by the movement-transmitting member 45 so as to be in contact with the corresponding resistor 60, as shown in FIGS. 4 and 8, and the conductive elastic member 50 located in the +X direction, −Y direction, and +Y direction are not in contact with the corresponding resistor 60, as shown in FIGS. 4 and 6. Therefore, the value of resistance changes at a section between the conductive elastic member 50 in the −X direction and the corresponding resistor 60, whereas the value of resistance does not change at a section between the conductive elastic member 50 located in the +X direction, −Y direction, and +Y direction and the corresponding resistor 60, and the normal electric current passes through the resistor 60.

Figure 7:
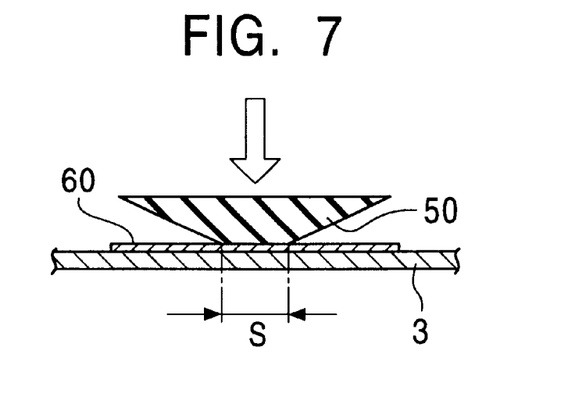
FIG. 7 is a sectional view showing an example of a state of the conductive elastic member when the control lever is depressed so that the operating point thereof moves from the neutral axis.

When the control lever 22 is tilted in the intermediate direction between the −X direction and the −Y direction, a peripheral section 45b of the movement-transmitting member 45 abuts against the bottom 1a of the upper casing 1 to serve as a tilt fulcrum, and the operating point P of the control lever 22 moves between the −X direction and the −Y direction to a position offset from the position on the neutral axis N during non-operation of the control lever 22. In this state, the conductive elastic member 50 located in the −X direction and the −Y direction is in contact with the corresponding resistor 60, as shown in FIGS. 4 and 7. However, since an area of contact S is small compared to a case where the control lever 22 is tilted in the −X direction, the value of resistance increases compared to a case where the control lever 22 is tilted in the −X direction and the small electric current passes through the resistor 60. In addition, since the conductive elastic member 50 located in the +X direction and the +Y direction is not in contact with the corresponding resistor 60, as shown in FIGS. 4 and 6, the value of resistance does not change at a section between the conductive elastic member 50 located in the +X direction and the +Y direction and the corresponding resistor 60, and the normal electric current passes through the resistor 60.

According to this controller, the direction of movement of the operating point P of the control lever 22 and the tilt angle can be detected by observing the change in voltage from the change in electric current passing through the resistors 60, and detected signals can be input as analog signals from the flexible board 3 to the computer game machine via a tape wiring 33 and the cable 23 described below.

In addition, according to this controller, when the control lever 22 is axially pushed by hand, the stick 22a moves downward, as shown in FIG. 5, whereby the coil spring 71 is compressed by the presser portion 22d, and the rod 22c moves downward to press the push switch 70 in the ON state. When the control lever 22 is released, the coil spring 71 is returned to its original state. Therefore, the stick 22a is pushed up by the coil spring 71, whereby the control lever 22 is returned to the non-operation state, as shown in FIG. 3. In addition, since the rod 22c separates from the push switch 70, the push switch 70 is changed to the OFF state. Since the movement-transmitting member 45 is provided separately from the control lever 22, if the control lever 22 is moved so that the operating point P is not offset from the neutral axis N, the movement-transmitting member 45 does not move in accordance with the upward and downward movements of the control lever 22, and the conductive elastic members 50 do not come into contact with the resistors 60.

The ON/OFF state of the push switch 70 can be input as an analog signal from the flexible board 3 to the computer game machine via the tape wiring 33 and the cable 23 described below.

Figure 9:
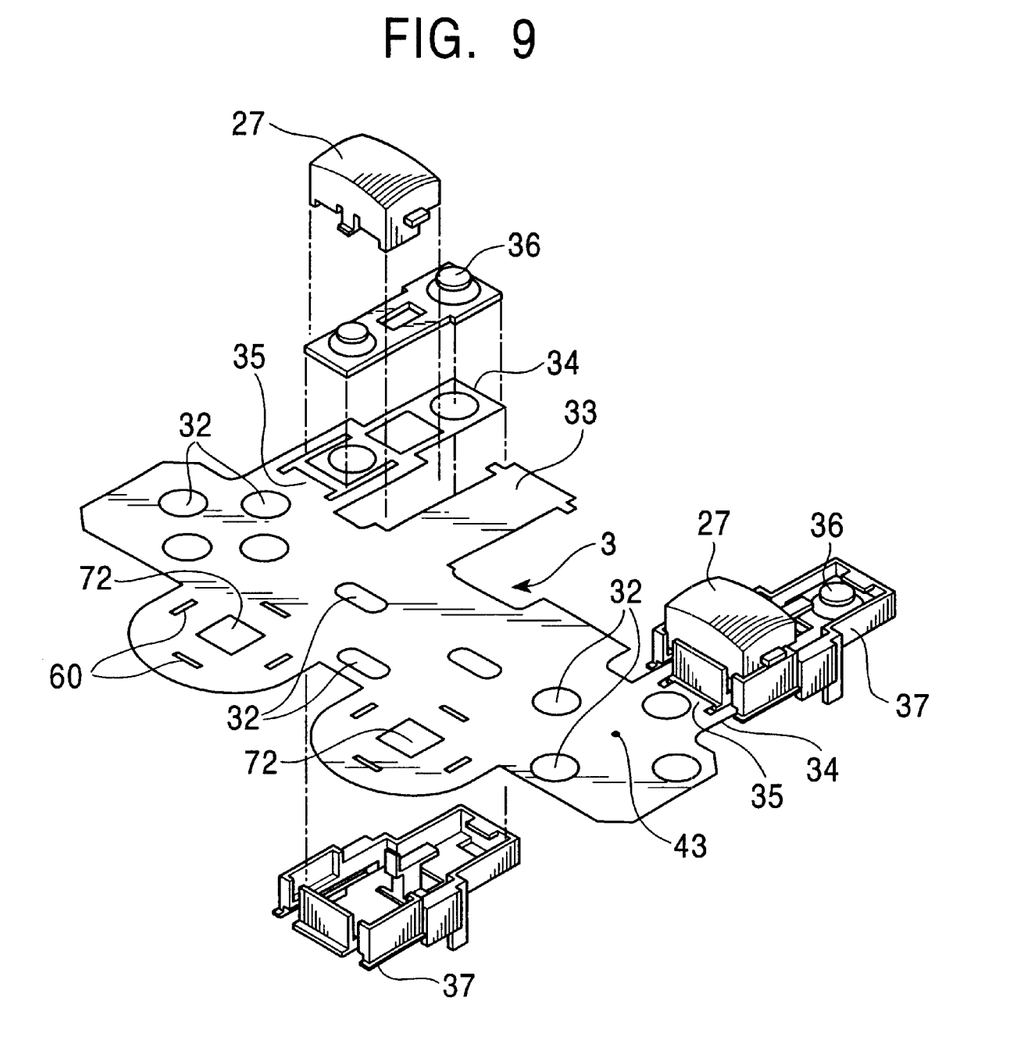
FIG. 9 is a perspective view showing a flexible board of the controller for a computer game machine.

As shown in FIGS. 2 and 9, at positions on the upper surface of the flexible board 3 corresponding to cross key (digital control member) 11, the key top (digital control member) 12, and the selection keys (digital control members 13 on the upper surface of the upper casing 1, there are formed contact patterns 32 for effecting ON/OFF operation in response to operation of these keys 11 through 13. Between the contact patterns (lower contact) 32 provided to oppose the digital control members and the digital members, there are provided upper contacts (not shown) formed of conductive rubber or the like inside dome-like elastic members formed of rubber or the like. These upper and lower contacts constitute digital switches. A digital input section in this embodiment is composed of the above digital control members, and the digital switches for effecting ON/OFF operation in response to the operation of the digital control members. Furthermore, substantially the central portion of the front face side of the flexible board 3 extends forward to form tape wiring 33 connected to the connector (not shown), and the end portions corresponding to the protrusions 16 of the upper casing 1 extend forward to form tape contacts 34.

H-shaped slots are formed in the root portions of the tape contacts 34, and back side of the slots project forward to form rebound-preventing pieces 35. On these tape contacts 34, there are placed rubber contacts 36 having two contacts, and these rubber contacts 36 are fitted into holders (support members) 37 with the tape contacts 34 and fixed therein. Button keys 27a and 27b are fitted into these holders 37 so as to come into contact with the contacts on the inside of the flexible board 33 of the rubber contacts 36 to make it possible to effect ON/OFF operation.

Figure 10:
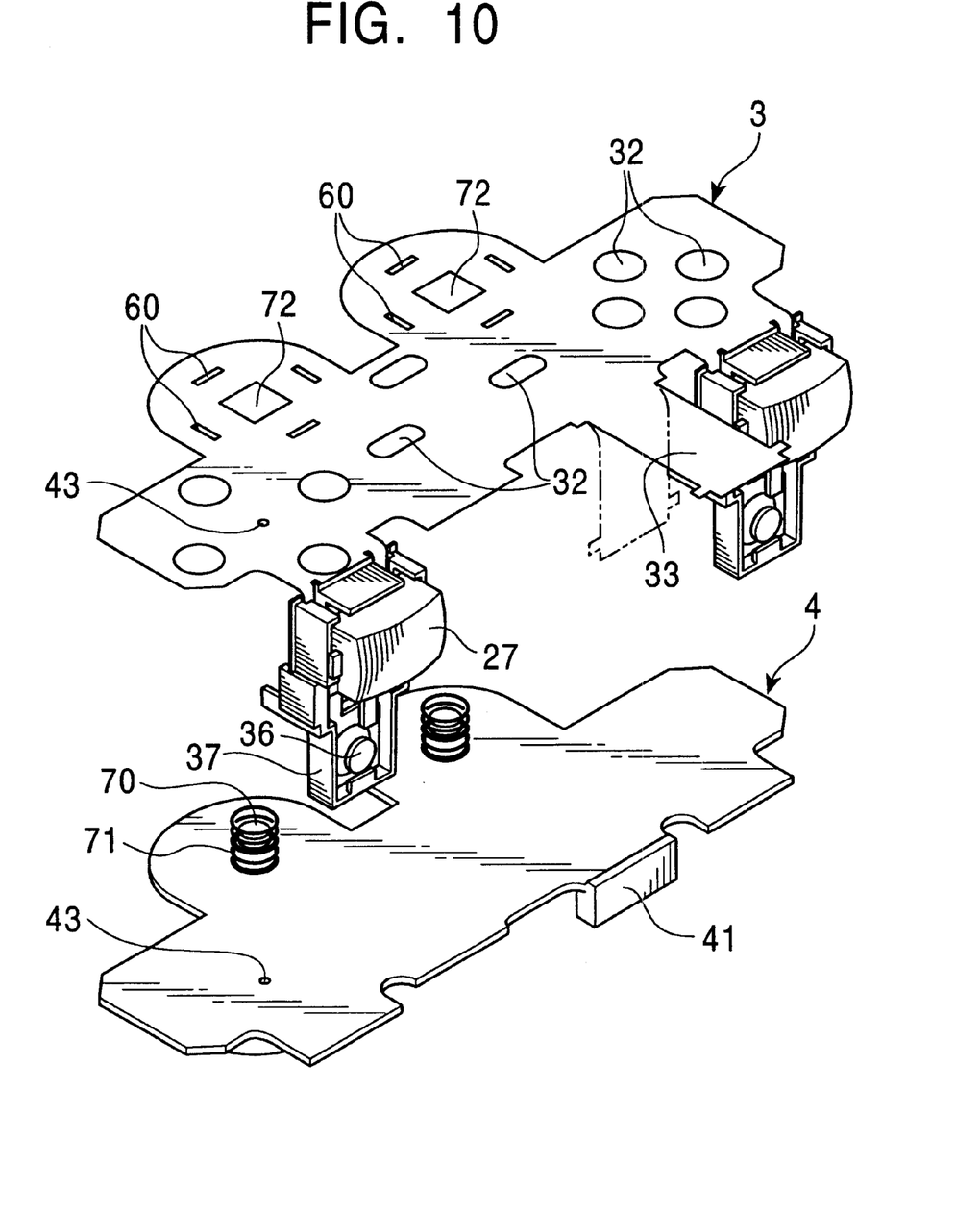
FIG. 10 is a perspective view showing the positional relationship between the flexible board and a plate in the controller for a computer device.

When the holders 37 are erected vertically on the flexible board 3, as shown in FIG. 10, the projected pieces 35 enter below the holders 37 so as to prevent the resilience of the tape contacts 34. The vertically erected holders 37 are fitted into protrusions 26 of the lower casing 2, and the button keys 27a and 27b are connected to the outer contacts of the rubber contacts 36 to make it possible to effect ON/OFF operation.

On the other hand, the tape wiring 33 is inserted into a slit of a wall portion 41, which is provided at the end on the front face side of the plate 4 for preventing static electricity, to be thereby vertically supported, and the forward end thereof is inserted into the connector of the lower casing 2 to be thereby electrically connected. The wall portion 41 is located at the connecting portion of the upper casing 1 and the lower casing 2 to thereby prevent static electricity from outside, preventing the influence of static electricity on the tape wiring 33. And, in the flexible board 3 and the plate 4, there are formed holes 43 for inserting thereinto positioning pins (protrusions) 42 provided on the upper casing 1.

According to this controller, by operating the cross key 11, the key top 12, the selection keys 13, the button keys 27, and the control levers 22, digital signals corresponding to the operations are input from the flexible board 3 to the computer game machine via the tape wiring 33 and the cable 23. In addition, by moving the operating points P of the control levers 22 from the neutral axes N, analog signals corresponding to the movements are input to the computer game machine.

To assemble the controller, the cable 23 provided on the lower casing 2 is first drawn to the outside.

Next, the rubber contacts 36 are placed on the tape contacts 34 of the flexible board 3, and are fitted into the holders 37, and the button keys 27a and 27b are fitted into the holders 37 so as to be connected to the inside contacts of the rubber contacts 36.

Thereafter, the holders 37 are erected vertically on the flexible board 3, and the projected pieces 35 are inserted below the holders 37, whereby the holders 37 are held vertically on the flexible board 3, and no resilience of the tape contacts 34 occur.

Then, the tape wiring 33 is inserted into the slit of the wall portion 41 the support plate 4, and the plate 4 is brought into close contact with the flexible board 3, causing the tape wiring 33 to protrude in the same direction as the erected holders 37.

Then, the positioning pins 42 of the upper casing 1 are inserted into the holes 43 of the flexible board 3 and the plate 4, and the flexible board 3 is pressed against the inner surface of the upper casing 1 by the plate 4. In this case, the push switches 70 and the coil springs 71 therearound protrude from holes 72 of the flexible board 3.

Then, the upper casing 1 is fitted into the lower casing 2, with the flexible board 3 and the plate 4 being accommodated therein, to form an integral unit to thereby assemble the controller. In this case, the tape wiring 33 is connected to the connector (not shown) provided in the lower casing 2, and the control levers 22 protrude from holes 14 of the upper casing 1.

The controller of this embodiment includes at least one control lever 22 projecting to the outside of the upper casing 2, the movement-transmitting member 45 provided around and separately from the control lever 22 which is operatively associated with the movement of the operating point P of the control lever 22, a plurality of conductive elastic members 50 provided on the movement-transmitting member 45, the flexible board 3 provided in an inner space defined by the upper casing 1 and the lower casing 2 and having provided thereon a plurality of resistors 60 corresponding to the conductive elastic members 50, and the push switch 70 provided in the inner space at a position corresponding to the position of the control lever 22 for effecting ON/OFF operation in response to upward and downward movement of the operating point P of the control lever 22. In the controller, the conductive elastic members 50 change the areas of contact between the conductive elastic members and the resistors 60 according to a direction of movement and a tilt angle of the operating point of the control lever 22. With this configuration, unlike a conventional input device for a game machine in which rotary potentiometers are provided between a control lever and the board connected to the control lever, the structure of the analog input section is simplified, and analog signals corresponding to the movement of the operating point P of the control lever 22 can be input to the game machine without using the expensive rotary potentiometers. Therefore, it is possible to reduce the cost of the input device.

In addition, since the analog input section included in the controller of this embodiment has no need of including the rotary potentiometers included in an analog device of a conventional controller (input device), the thickness of the analog input section is reduced, whereby it is possible to reduce the size and thickness of the overall device.

Furthermore, the thickness of the analog input section included in the controller of this embodiment can be very reduced as compared to the analog input section having the rotary potentiometers included in the conventional controller. Therefore, unlike the conventional controller in which the analog input section is provided on a second board that is separately provided from a first board having provided thereon contact portions connected to digital control members, such as a cross key, a key top, selection keys, and the like, the analog input section of the controller of this embodiment can be provided on the flexible board 3 having provided thereon contacts connected to the digital control members, such as the cross key, the key top, the selection keys, and the like, and the resistors 60 can be provided on a lower sheet constituting the flexible board 3. Therefore, the number of boards used in the device can be reduced, and the thickness and weight of the analog input section are reduced, whereby it is possible to reduce the size, thickness, and weight of the overall device.

Furthermore, the controller of this embodiment includes, at least one control lever 22 projecting to the outside of the upper casing 1, at least one digital control member, such as the cross key, the key top 12, the selection keys 13 or the like, the analog input section operating in association with the movement of the operating point P of the control lever 22, the digital input section for effecting ON/OFF operation in response to the operation of the digital control member, and the flexible board 3 having formed thereon one of the contacts 60 constituting the analog input section and the contact pattern 32 constituting the digital input section. Therefore, compared to the conventional input device for a game machine in which the analog input section is provided on a second board that is separately provided from a first board having provided thereon contact portions connected to digital control members, such as a cross key, a key top, selection keys, and the like, the number of boards used in the controller can be reduced, and the thickness and weight of the analog input section are reduced, whereby it is possible to reduce the size, thickness, and weight of the overall device.

In addition, the controller of this embodiment includes the movement-transmitting member 45 provided around and, in particular, separately from each of the control levers 22, a plurality of conductive elastic members 50 provided on the movement-transmitting member 45, the flexible board 3 provided in an inner space defined by the upper casing 1 and the lower casing 2 and having provided thereon a plurality of resistors 60 corresponding to the conductive elastic members 50, and the push switch 70 provided in the inner space at a position corresponding to the position of the control lever 22 for effecting ON/OFF operation in response to upward and downward movement of the operating point P of the control lever 22. With this configuration, one control lever can serve as both of an analog control member and a digital control member. That is, when the control lever 22 is moved downward so that the operating point P does not offset from the neutral axis N, the control lever 22 pushes the push switch provided corresponding to the control lever 22 in the ON state. Since, however, the movement-transmitting member 45 does not move and the conductive elastic members 50 do not come into contact with the resistors 60, digital signals are input to the game machine. When the control lever is depressed so that the operating point P moves from the neutral axis N, the movement-transmitting member 45 moves to bring the conductive elastic members 50 into contact with the resistors 60, and moreover, the areas of contact between the conductive elastic members 50 and the resistors 60 correspond to the amount of movement of the control lever 22, but the control lever 22 does not come into contact with the push switch 70. Therefore, analog signals are input to the game machine. In addition, when the control lever 22 is axially pushed and depressed so that the operating point P moves from the neutral axis N, both of the digital signals and analog signals are input to the game machine.

While the controller (input device) of the present invention has been described in conjunction with the preferred embodiment with reference to the attached drawings, it is to be understood that the invention is not limited to the disclosed embodiment, and that various design changes and the like are possible without departing from the scope of the present invention.

For example, the shape and number of the control lever 22, the shape of the movement-transmitting member 45, and the shape and number of the conductive elastic members 50 may be appropriately changed.

What is claimed is:

1. An input device to input multi directional signals, comprising:

a casing having a bottom surface and an opening formed in said casing;

at least one control member projecting to the outside of the casing through said opening;

a movement-transmitting member separately formed around said control member so that said control member moves up and down independently of the movement-transmitting member, said movement-transmitting member operatively associated with tilting movement of said control member, said movement-transmitting member being provided with a plurality of conductive elastic members;

and a board provided in the casing and having formed thereon resistors corresponding to said conductive elastic members, said conductive elastic members changing an area of contact between said conductive elastic members and said resistors according to a direction of movement and a tilt angle of said control member to vary an amount of resistance;

said movement-transmitting member including a peripheral section that abuts against said bottom surface of said casing to serve as a tilt fulcrum when said control member is tilted;

wherein, by tilting movement of said control member, at least one analog signal corresponding to the movement is outputted.

2. An analog input device according to claim 1, wherein said movement-transmitting member is skirt-shaped.

3. An analog input device according to claim 1, wherein each of said conductive elastic members is shaped like one of a frustum of a pyramid and a truncated cone, and is gradually deformed from an end thereof according to an operating force exerted on said control member.

4. An analog input device according to claim 1, wherein elastically deformable support members are attached to said movement-transmitting member, and said conductive elastic members are provided on bottoms of the support members.

5. An analog input device according to claim 1, wherein, by tilting movement of said control member, less than or equal to half of number of said conductive elastic members contact with said resistors.

6. An analog input device to input multi directional signals, comprising:
- at least one control member projecting to an outside of a casing;
- a movement-transmitting member separately provided around said control member so that said control member moves up and down independently of the movement-transmitting member, said movement-transmitting member engaging the inner surface of the casing and this engagement is operatively associated with tilting movement of said control member from a neutral axis, said movement-transmitting members being provided with a plurality of first contacts;
- a board provided in said casing and having formed thereon a plurality of second contacts constituting planar analog switches with the first contacts; and
- a push switch provided in said casing at a position corresponding to said control member to effect an ON/OFF operation in response to upward and downward movements of the operating point of said control member.

7. An analog input device according to claim 6, wherein each of said first contacts is composed of a conductive elastic member shaped like one of a frustum of a pyramid and a truncated cone, and ends of the conductive elastic members gradually come into contact with the second contacts, whereby an area of contact is changed.

8. An analog input device according to claim 6, wherein said movement-transmitting member has a through hole in a center thereof, and said control member is inserted into said through hole to be supported to move up and down.

9. An analog input device according to claim 6, wherein, by tilting movement of said control member, less than or equal to half of the number of said first contacts contact with said second contacts.

10. An analog input device to input multi directional signals, comprising:
- at least one analog control member and at least one digital control member projecting to an outside of a casing;
- an analog input section operating in association with movement of an operating point of said analog control member, said analog input section comprises;
- at least one control member projecting to an outside of the casing;
- a movement-transmitting member separately provided around said control member so that said control member moves up and down independently of the movement-transmitting member, said movement-transmitting member engaging the inner surface of the casing and this engagement is operatively associated with tilting movement of said control member from a neutral axis, said movement-transmitting member being provided with a plurality of first contacts;
- a digital input section to effect an ON/OFF operation in response to operation of said digital control member; and
- a board having formed thereon one of contacts constituting said analog input section and one of contacts constituting said digital input section;
- wherein, by tilting movement of said control member, at least one analog signal corresponding to the movement is outputted.

11. An analog input device according to claim 10, wherein said analog input section is composed of a conductive elastic member provided on said analog control member and a resistor opposing said conductive elastic member, said digital input section is composed of a first contact provided on said digital control member and a second contact opposing the first contact, and a resistor and said second contact are formed on the board.

12. An analog input device according to claim 11, wherein the board is composed of a flexible board.

13. An analog input device according to claim 10, wherein, by tilting movement of said control member, less than or equal to half of the number of said first contacts contact with said one of contacts constituting said analog input section.

* * * * *